United States Patent Office 2,768,117
Patented Oct. 23, 1956

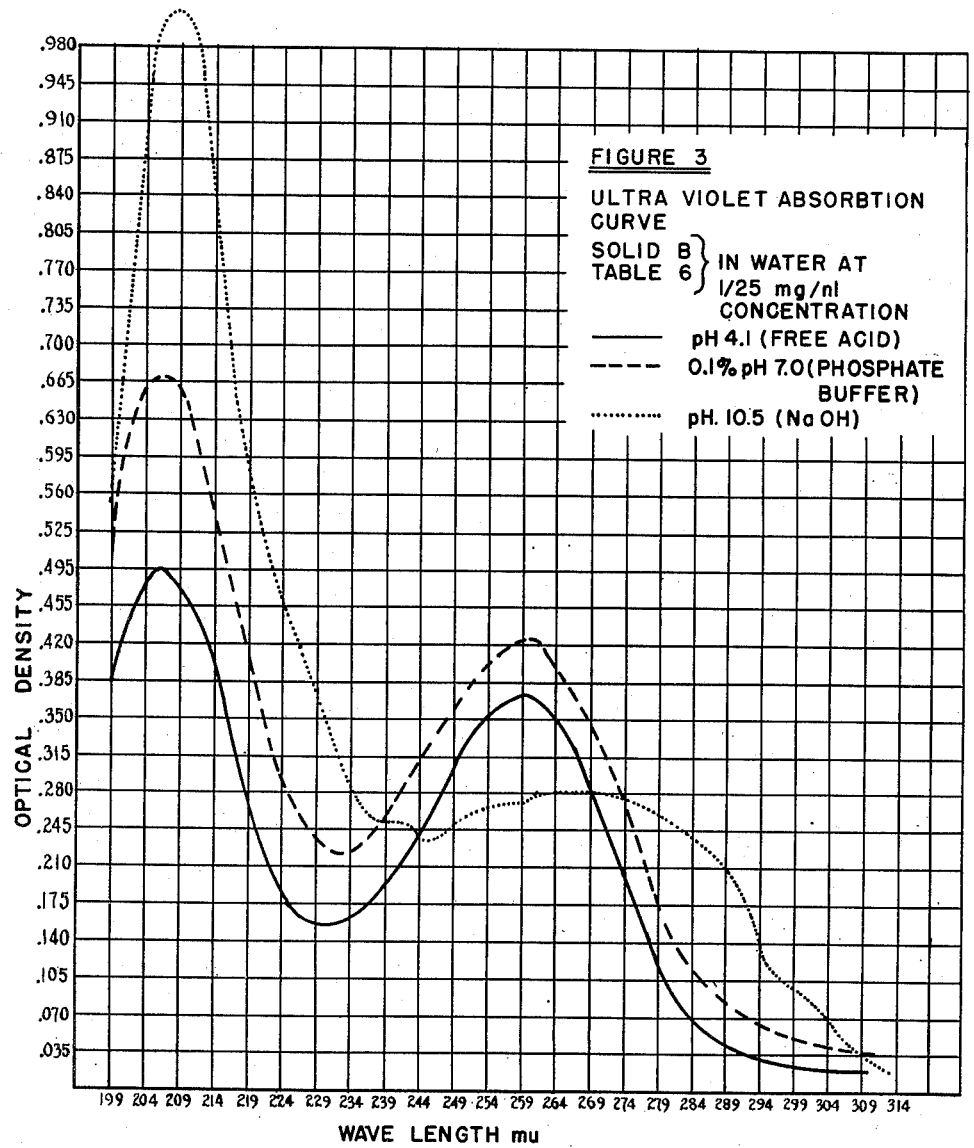

2,768,117

PRODUCTION OF PENICILLIN EMPLOYING MEDIA CONTAINING CYTIDENE AND CYSTEINE

Murray Arthur Kaplan, Syracuse, N. Y., assignor to Bristol Laboratories Inc., Onondaga County, N. Y., a corporation of New York Application September 15, 1952, Serial No. 309,707

1 Claim. (Cl. 195—36)

This invention relates to the discovery, production and isolation of a new biological growth factor, which I call the "RM 218 factor."

This RM 218 factor is of value in stimulating the production of penicillin, in the usual fermentation. In this connection, it may be advantageous to add cysteine and vitamin $B_{12}$ to the RM 218 factor.

The RM 218 factor is required for growth by an ultraviolet-induced mutant of the fungus *Neurospora crassa*, designated RM 218. The RM 218 factor is widely distributed in nature, being found, for example, in animal liver, plant malt, corn steep liquor and microbial, streptomyces extracts or ferments. By utilizing RM 218 as an assay tool, it has been established that the RM 218 factor is not one of the following products:

TABLE 1

*Substances which gave no growth response with RM 218 for 7 days at 25° C.*

| | | |
|---|---|---|
| Citrulline | L Hydroxyproline | A. D. P. |
| L Arginine | L Tryptophane | A. T. P. |
| Dl Ornithine | L Glutomic Acid | Adenine |
| L (+) Cysteine | DC Threonine | Adenilic Acid |
| Cystine | Dl Valine | Adenosine |
| Dl Methionine | Dl Norvaline | Guianine |
| Dl Lencine | Dl Serine | Guanidine |
| L Lencine | L Tyrasine | Guanilic Acid |
| Dl Isolencine | Glycine | Guanosine |
| Norlencine | L Aspartic Acid | Cytidine |
| L Asparagine | Dl Aspartic Acid | Cytidalic Acid |
| Dl Asparagine | Dl Asparagine | Cytosine |
| L Histidine | L Asparagine | Uracil |
| D L Histidine | L Taurine | Uridine |
| Histamine | Strepogenin | Uric Acid |
| L Lysine | Alpha Keto Glutanic Acid | Xanthine |
| Dl Lysine | 11 Aminobutyric Acid | Hypoxanthine |
| Dl Alanine | Betaine | Thymine |
| β Alanine | Glutathione | Glocose-6-Phosphate |
| L Proline | Crestinine | Phosphoglyceric Acid |
| Lactose | Vitamin C | Oleic Acid |
| D (+) Raminose | Choline | Stearic Acid |
| Galactose | Innositol | Linolic Acid |
| D (−) Levulose | Thiamine | Linoleic Acid |
| D (+) Manose | Riboflavin | Lipoic Acid |
| Dextrose | Pyridoxine | Bile Salts |
| Ribose | Pyridoxal | Cholesterol |
| Xylose | p-aminobenzoic Acid | Brewer's Yeast |
| L (+) Arabinose | Nicotinic Acid | Beer Solids |
| Raffinose | Nicotinamide | Whole Milk |
| Mannose | Ca Pantothenate | Cream |
| Melibiose | Pantethol | Butter |
| Glycogen | Pantetheine (L. B. F.) | Butter Milk |
| Cellobiose | β Mercapto ethylamine | Difco Tomato Juice Extract |
| Cellulose | Folic Acid | Difco Beef Extract |
| Starch | Citrovorum Factor | Difco Peptone |
| N-Methyl Glucose Amine | Vitamin $B_{12}$ | Difco Skim Milk Solids |
| Vitamin A | Biotin | Difco Heart Infusion Solids |
| Vitamin D | C1 to C10 Aliphatic Acids | V-8 Juice |
| Carotene | Pyruvate | Powdered Egg Extract |
| Vitamin K | Oxalacetate | Eviscerated Fish Solubles |
| Cortisone | | |
| Desoxycorticosterone Glucocide | | |
| Desoxycorticosterone Estradio. | | |
| Glucuronolactone | | |
| Neurospora Wild-Type Powder | | |
| Thioglycolic Acid | | |
| Clover Extract | | |
| Grass Juice | | |

The combined physical properties of the factor are unlike that of many of the known metabolites or antimetabolites. The acidic nature of the substance has been definitely established by its adsorption on anion exchange resins. Cation exchange resins showed no adsorption whatsoever. Failure to distribute from water into diversified solvents at a pH range of 2.0, 7.0, and 10 would indicate high degree of polarity. Most of the common synthetic and naturally-occurring adsorbents did not adsorb the factor from water over a broad pH range. The lack of precipitation by heavy metals and the complete stability to refluxing 0.15 NHCl or NaOH would appear to distinguish the RM 218 factor from most of the known acid metabolites.

An attempted isolation of the factor from limited quantities of yeast extract was carried out. A sequence of carbon adsorption and elution followed by mixed bed ion exchange adsorption and elution, ethanol fractionation of the resulting solids, and finally basic alumina chromatography, resulted in the recovery of colorless, partially crystalline solids showing a marked potency increase over the crude yeast extract.

MEDIA

The mineral media used as an assay vehicle with the ultra-violet-induced Neurospora mutant, designated RM 218, is essentially the same as that reported by Mitchell and Houlahan (1946). It consists of the following components in gram per liter of distilled water: ammonium tartrate, 5; $NH_4NO_3$, 1; $KH_2PO_4$, 1; $MgSO_4 \cdot 7H_2O$, 0.5; NaCl, 0.1; $CaCl_2$, 0.1; sucrose, 20; biotin, $5 \times 10^{-6}$. In addition, trace elements added as salts are present as follows in milligrams per liter of solution: Sodium tetraborate, 88; ammonium molybdate, 64; ferric chloride, 500; zinc sulfate·$7H_2O$, 200; cupric chloride, 270; manganous chloride, 45.

The pH of the autoclave media is approximately 5.6 Adjustment of the pH is usually not necessary.

THE ASSAY

The solids or solutions to be tested for growth promotion with mutant RM 218 are placed in a 125-ml. Erlenmeyer flask. Twenty ml. of the minimal medium is added, and the solution or suspension is autoclaved at 15 pounds pressure for twelve to fifteen minutes. One drop of conidial suspension in sterile water is added to the cooled (25° C.) sterile test solution, and the inoculated sample is incubated at 25° C. for seven days.

The mycelia is then removed with a glass rod and pressed dry between paper towels. The compressed mold pad is then dried at 60° to 80° C. for 24 hours and weighed to within the nearest 1/10 of a milligram.

Duplicate assays of crude and partially purified growth factors checked within 5% with five different media lots.

ADSORPTION MATERIALS

(a) Darco KB

Darco KB is an activated charcoal of strong adsorbing capacity. It is supplied by the Darco Company.

(b) Ion exchange resins (1) IR4B is a Rohm and Haas Company weak amino type anion exchanger which does not split salts as the free base.

(2) IR45 is a weak anion exchanger similar to, but of a greater capacity than, IR4B.

(3) XE98 is a strong large-pored Rohm and Haas Company quaternary ammonium salt anion exchanger which functions as an ion exchanger in the salt form and a salt splitter as the free base.

(4) IRC50 is a weak Rohm and Haas Company carboxylic acid cation exchanger which does not split salts.

(5) IR120 (8% cross-linked) is a very strong, large-pored Rohm and Haas Company sulfonic acid cation exchanger which functions in ion exchange in the salt form and splits salts in the free acid form.

(6) Dowex 50 (a Dow Corporation resin) is similar to IR120 but has somewhat larger pore sizes (4% cross-linked).

PREPARATION OF RESINS FOR CHROMATOGRAPHY

The anion exchangers were washed downflow in columns with excess 4% NaOH to obtain the free base. XE98·HCl was obtained by washing in columns with excess 4% HCl.

The free acid cation exchangers were obtained by washing in columns with excess 2% HCl. The salt forms were obtained by washing with excess 4% NaOH.

Washings or elutions or adsorptions with both forms of the resins were downflow at a rate of 0.25 ml./ml. of resin/minute. Between washings and elutions, the resins were back-washed with distilled water to pH 4.5 or 7.5. The resins were then allowed to settle by gravity, which usually gives a settling of the resin in graded particle size.

VITAMIN MIXTURE

The vitamin mixture used in experimentation with Neurospora RM 218 contains the following crystalline vitamins in milligrams per liter of distilled water; thiamine, 100; riboflavin, 50; pyridoxine, 50; calcium pantothenate, 200; choline, 200; p-aminobenzoic acid, 50; nicotinamide, 200; innositol, 400; folic acid, 1.

PROPERTIES AND ISOLATION OF RM 218 GROWTH FACTOR

(A) Precipitation (1) SOLVENT

The RM 218 factor (as a 10 to 20% aqueous solution of crude Difco yeast extract at pH 5 to 7) was not precipitated by the addition of two to three volumes of methanol, ethanol, isopropanol, or propanol or acetone to any significant extent. The activity starts to precipitate upon further addition of the above solvents. At a pH of 2.0 (HCl) the activity appears to be much more soluble in water-solvent mixtures.

(2) HEAVY METALS

Barium acetate at pH 8.9 alone or with two volumes of alcohol, or mercuric or lead acetate at pH 4.5 failed to precipitate a significant amount of activity from a 100 mgm./ml. aqueous solution of Difco yeast #4510559. In all instances a fair amount of color was precipitated along with some extraneous plus a small amount of the total activity. From a 5 gm. sample of Darco KB derived semipurified Difco yeast solid assaying 1/3.3, 5/20.3 (Designation of response of Neurospora RM 218 to growth factor · weight sample for assay in mgm./weight dry mycelia in mgm., 7 days-25° C.) 2.6 gms. of solids were not precipitated at pH 8.9 with Ba acetate-2 volumes alcohol. An increase in potency to 1/5, 5/32 was noted. The precipitated solids were inactive.

(3) ACIDS

Phosphotungstic acid at a pH range of 2 to 7.5 failed to precipitate active solids from a 50–100 mgm./ml. aqueous solution of the crude Difco yeast extract. Picric acid and methyl orange failed to precipitate any activity at pH 6.5. Reinecke salt at a pH range of 2 to 7 also failed to precipitate activity.

(4) AMINES

A 30% solution of procaine·HCl containing 100 mgm./ml. of crude difco yeast, or excess rosin-amine "D" acetate failed to precipitate the RM 218 factor.

The β isomer of p-cyclohexyl amine·HCl, a precipitant for phosphate ion and organic phosphates also failed to precipitate activity from a 100 mgm./ml. aqueous concentrate of crude Difco yeast extract. A fair amount of color and crystalline solids were precipitated.

Highly purified RM 218 factor also failed to precipitate with the heavy metals or amines used with the crude yeast extract.

Alkaloids were not tried.

(B) Extraction (1) Aqueous RM 218 factor (crude Difco yeast) could not be distributed into butanol, chloroform, ether, methyl isobutyl ketone, or butyl acetate at a pH range of 2, 7, and 10. All the activity and most of the crude solids remained in the extracted aqueous.

(2) Twenty volumes of boiling ethanol or methanol extracted only a very small percentage of the crude Difco yeast RM 218 factor. The extracted solids were no more potent than the non-extracted or starting crude solids.

The crude yeast activity could be extracted in quantity with 10 volumes of ETOH or MCOH+HCl to pH 1.5. Cold concentration of the acid solutions five-fold precipitated inactive solids. The addition of ten volumes of acetone or ether to the concentrated mother liquors precipitated additional inactive solids.

Distillation of the solvents in the presence of water with subsequent lyophilization of the aqueous extract resulted in brown glues. The potency of the glues, 1/5.2, 5/30, were far less than expected from the weight recovered. The glues were composited and dissolved in 25 mls. of ethanol. Ten volumes of acetone precipitated inactive solids. (All solids designated as inactive showed no growth with RM 218 at a level of 5 to 10 mgm. for 7 days at 25° C.) Fifty mls. of water was added to the ethanol-acetone mother liquor and the solvents were removed by cold distillation. The acid water was neutralized and passed through a 1/2-inch diameter column containing 20 mls. of acid cycle IR120 resin. The partially decolorized acid effluent was lyophilized to give tacky tan solids assaying 5/54. None of the starting methanol or ethanol HCl insoluble solids or those obtained as precipitates upon concentration and addition of acetone or ether showed any activity before or after passage through IR120.

(3) BATCH ADSORPTION OF CRUDE DIFICO YEAST EXTRACT #4510559

Aqueous crude Difco yeast RM 218 factor at 10 mgms./ml. failed to adsorb with twice the weight of batch or adsorption column silica, acid washed and basic Alumina, Superfiltrol, Florisil, Magnesol, Silene, Florex, Floridin, Decalse, and Fullers Earth at a pH range of 2.0, 7.0, and 9.5. At pH 2.0 or 8.5, one to two weights of Darco KB (activated charcoal) per weight of Difco yeast extract as a 1 to 10% solution adsorbed the RM 218 factor in quantity. At pH 2.0 all of the color adsorbed on the carbon. Only a fraction of the color adsorbed at pH 8.5. A 25% butanol-water mixture eluted the activity. The eluate from the acid carbon showed a fair degree of color removed. The pH 8.5 eluate was a very pale yellow.

The adsorption and elution characteristics of the crude RM 218 factor with Darco KB is shown on Table 2.

TABLE 2

Adsorption and elution characteristics of crude RM 218 factor with Darco KB

| Substance | mgm. Weight Recovered | Assay, 7 Days, 25° C. |
|---|---|---|
| (A) 1 gm. Difco yeast extract #4510559 | | 5/9.3, 10/30 |
| (1) A not adsorbed on Darco KB, pH 2.0 | 850 | 5/NG, 10/NG |
| (2) A adsorbed on Darco KB, pH 2.0, and eluted with 25% butanol-water. | 170 | 5/26, 10/49 |
| (3) A adsorbed on Darco KB, pH 2.0, eluted with 25% butanol-water-NH₄OH, pH 8.5 after 2. | 18 | 5/NG, 10/NG |
| (4) A not adsorbed on Darco KB, pH 8.5 | 700 | 5/NG, 10/NG |
| (5) A adsorbed on Darco KB, pH 8.5, eluted with 25% butanol-water. | 110 | 1/9.1, 5/38 |
| (6) A adsorbed on Darco KB, pH 8.5, eluted with 25% butanol-water-HCl-pH 2.0 after 5. | 64 | 5/NG, 10/NG |

(4) ION EXCHANGE CHROMATOGRAPHY

(4a) XE98

At a concentration of 10 mgm./ml. and a pH of 6.5, all the color in an aqueous solution of crude Difco yeast extract #4510559 adsorbed on a 5 volume-weight XE98·HCl column. The colorless effluent contained the activity. These solids from the effluent at an aqueous concentration of 2 mgm./ml. and at an adjusted pH of 7.0 were passed through 10 volumes/weight of acid cycle IR120. The acid effluent was lyophilized to yield active solids.

Using a similar technique as above, all the color and activity adsorbed on a 5 volume/weight XE98·OH (free base) column. The color was zoned 1/2 way down the column, indicating replacement by inorganic or organic anions. A 10% NH4OH elution of the column failed to elute any color or activity (NH4OH is a weaker base than XE98·OH). Excess 1 N HCl eluted the color and activity mostly in a frontal band. 2.5 gms. of yellow solids from 20 gms. starting crude yeast extract were recovered from the acid eluate after lyophilization. 1 gm. of these solids at a concentration of 10 mgm./ml. and an adjusted pH of 7.0 was passed through 10 volumes/weight of acid cycle IR120. The acid effluent was lyophilized to yield quite active yellow solids.

(4b) 4B–1R45

No activity solids or color from a 10 mgm./ml. solution of Difco yeast #4510559 at pH 2.0 (HCl) adsorbed on a 25 volume/weight free base 1R4B or 1R45 column.

(4c) 1RC50-Na cycle 800 mgm. from 1 gm. of crude Difco yeast at a concentration of 10 mgm./ml. at pH 6.4 passed a 10 volume/weight Na 1RC50 column. All the color passed the column. The effluent solids showed a potency of 5/10.2, 10/28.7 as compared to 5/9.3, 10/30 for the crudes.

(4d) Dowex 50-acid cycle

A fair portion of the color and extraneous substances from a 10 mgm./ml. solution of acid carbon-butanol water derived activity on a 10 volume/weight of acid cycle Dowex 50 exchange column. Marked purification was noted in the lyophilized solids from the acid effluent.

Excess 50/0 NH4OH solution eluted the adsorbed inactive solids from the Dowex 50.

The free acid effluent solids from the Dowex 50 could be further purified with an increase in potency by extraction with hot methanol or ethanol.

(4e) 1R120-acid cycle

Crude yeast activity or semipurified RM 218 factor from Darco KB followed the same pattern as observed with Dowex 50.

(4f) Mixed bed de-ionization and adsorption

Active material (adjusted to pH 7.0 in a 10 mgm./ml. water solution) which passed the XE98·HCl resin or which was eluted with HCl from the XE98·OH resin could be additionally purified by passage through Dowex 50 or 1R120 acid cycle resin. Cations were removed. Neutral substances, anions, and the anion-free acid RM 218 factor passed the resins. Potency increases were noted. Crude yeast or Darco KB derived RM 218 factor, after passage through Dowex 50 or 1R120 acid cycle resins could be adsorbed on the free base 1R4B or 1R45 resins. Neutral substances passed the cationic (anion exchanger) resins. The adsorbed anions plus the RM 218 factor could be eluted from the 1R4B or 45 with excess 5 to 10% NH4OH as a frontal bond. Excess NH4OH was removed from the eluate by flash distillation to pH 7.0. Repassage of this neutral solution through acid cycle 1R120 removed ammonium ion. The effluent contained inorganic anions. Marked purification was noted in the lyophilized solids from the acid effluent. A small percentage of the total adsorbed RM 218 factor could not be eluted with NH4OH, but was removed by exhaustion of the column by elution with excess 2NHCl. Lyophilization of the free acid eluate gave solids. These solids could be fractionated with increase in potency by extraction into hot methanol or ethanol.

Table 3 represents a composite of the data obtained by use of the described ion exchange techniques.

TABLE 3

*The purification of the RM 218 factor by ion exchange*

| Description of Processing | Weight Solids Recovered, grams | Solid # | Assay, 7 Days, 25° C. |
|---|---|---|---|
| Crude Difco Yeast #4510559 | | 1 | 1/NG, 5/9.3, 10/30, 20/48 |
| Crude Yeast #? | | 2 | 1/NG, 5/NG, 10/4.6, 20/17.9 |
| 450 gms. #2 adsorbed on pH 2.0 Darco KB, and eluted with 25% butanol H2O. | 35 | 3 | 1/3.3, 5/23.3 |
| 27 gm. #1 adsorbed on 270 mls. XE98·OH and eluted with 2HCl. | 2.5 | 4 | 1/4.1, 5/28 |
| 1 gm. #1 passed through 10 mls. XE98·HCl. | 720 | 5 | 5/14, 10/38 |
| 1 gm. #4 passed through 10 mls. H-1R120. | 330 | 6 | 1/22, 5/43.3 |
| 700 mgm. #5 passed through 5 mls. of H-1R120. | 500 | 7 | 1/5.9, 5/35 |
| 1 gm. #1 passed through 15 mls. N-1RC50. | 800 | 8 | 5/10.2, 10/28.7 |
| 1 gm. #1 passed through 15 mls. H-1R120. | 370 | 9 | 5/8, 10/17 |
| 15 gm. #3 passed through 100 mls. H-Dowex 50. | 8.5 | 10 | 1/11.8, 5/38.5 |
| #10 not adsorbed on 250 mls. 1R4B. | 3.8 | 11 | 5/NG |
| #10 adsorbed on 1R4B, eluted with NH4OH. | 2.7 | 12 | 1/19.5, 5/47 |
| #10 adsorbed on 1R4B, not eluted with NH4OH, but eluted with 2NHCl after NH4OH. | 500 | 13 | 1/0.5, 5/6.4 |
| #12 recycled through H-1R120 | 1.7 | 14 | 1/22, 5/47.5 |

ADSORPTION CHROMATOGRAPHY 500 mgm. of free acid RM 218 factor #14 as described in Table 3 was extracted with 100 ml. of ethanol at 50° C. for five minutes. Fifty ml. of the ethanol extract was passed through a 3-gram, ¼" by 1¾" basic alumina column (packed by gravity in ethanol). All the color adsorbed on the alumina. The colorless effluent was evaporated to dryness. The column was then eluted with 100 mls. of methanol. Some color was removed. The methanol was evaporated to give yellow amorphous solids. Water (75 ml.) eluted most of the residual color. Sixty-five ml. of excess water was passed through the column after the yellow band was eluted. This eluate was composited with the preband and band eluate. The composite was lyophilized. Orange solids were obtained. Twenty mls. of 2% NH4OH then eluted a small amount of color as a frontal band. Light yellow solids were obtained after lyophilization. The column was washed with water to remove NH4OH and finally eluted with 25 mls. of 0.2 NHCl (an excess) which exhausted the column. White solids were obtained.

The second 50 ml. of ethanol extract was passed through a 3-gram ¼" by 3½" silica column (suspended in ethanol and packed by gravity). Unlike basic alumina, a fair portion of the color passed the column in the ethanol effluent. Methanol eluted some of the adsorbed color as a frontal band. Water eluted most of the residual color. 2% NH4OH eluted a very narrow yellow frontal band. The removal of this final pigment exhausted the column of all color. The ethanol and methanol effluents and eluates were evaporated (cold) to yield colored residues. All aqueous eluates were lyophilized as such colored solids were obtained.

The distribution of the RM 218 activity in fractions obtained by adsorption chromatography is shown in Table 4.

ULTRAVIOLET ABSORPTION

The ultraviolet absorption curve of partially crystalline solid B (Table 4) at a concentration of 1/25 mg./ml. and at pH 4.1, 7.0, and 10.5 may be seen in Figure 3 (see attached drawing). Maxim at 206 and 260 mu were observed.

TABLE 4

*Basic alumina and silica chromatography of an ethanol solution of purified, free acid RM 218 factor #14 (Table 5)*

| Description of Processing | Mgm. of Solids Recovered | Solid # | Assy | |
|---|---|---|---|---|
| | | | No Vitamins | 0.1 ml. B Vitamins+ 0.1 ml. Casein Hydrolysate |
| 500 mgm. solid #14, Table 5 | | 14 | 0.1/0.6, 1/12 | 0.1/14, 1/68 |
| #14 insoluble in 100 mls. ethanol at 50° C | 165 | A | 1/NG, 5/NG | 1/NG, 5/NG |
| Ethanol extract passing basic alumina column | 3.4 | B | 0.1/±, 1/11 | 0.01/4.8, 0.1/47 |
| Methanol eluate of basic alumina column | 30 | C | 0.1/NG, 1/NG | 0.1/NG, 1/NG |
| Water eluate of basic alumina column | 35 | D | 0.01/NG, 0.1/± | 0.01/0.6, 0.1/7.5 |
| 2% NH₄OH eluate of basic alumina column | 100 | E | 0.01/NG, 0.1/NG | 0.01/NG, 0.1/± |
| 2NHCl | 50 | F | 0.1/NG, 1/NG | 0.1/NG, 1/NG |
| Ethanol extract passing silica column | 100 | G | 0.01/NG, 0.1/2.4 | 0.01/2.1, 0.1/27 |
| Methanol eluate of silica column | 45 | H | 0.1/NG, 1/2.1 | 0.1/16.1, 1/28 |
| Water eluate of silica column | 11 | I | 0.01/NG, 0.1/NG | 0.01/NG, 0.1/NG |
| 2% NH₄OH eluate of silica column | 30 | J | 0.1/NG, 1/NG | 0.1/NG, 1/NG |

The complete lack of growth of Neurospora Mutant RM 218 when supplied with the selection of crystalline metabolites or crude sources listed in Table 1 indicate the presence of a new growth factor or vitamin in yeast extract. Widespread distribution of the RM 218 factor (liver, malt, corn, and Streptomyces ferment) suggest its classification as an important metabolite having a basic biochemical function.

The adsorption of the factor on cationic resins (1R4B, XE98) and nonadsorption on anionic resins (1R120) is indicative of definite acidic properties. The failure to distribute into butanol, butyl acetate, etc., from water at pH 2.0 suggests a high degree of polarity. The lack of precipitation of the acidic factor with the heavy metals is not consistent with the behavior of other acidic metabolites. Very few natural products (especially acids) do not adsorb on the large selection of adsorbents tried with the RM 218 factor.

The stability of the factor to acid or alkaline hydrolysis suggests a comparatively simple substance.

The following experiment demonstrates the increased production of penicillin obtained by the addition of the RM 218 factor:

Purified Neurospora RM 218 growth factor from yeast extract (Difco) #H6-ax was added to certain penicillin fermentations as follows:

| Composition of Media | Final Weight of Mycelia in G. | Broth Titer of Penicillin 'n v./ml. |
|---|---|---|
| 1. Control | 3.5 | 255 |
| 2. 0.05% Corn Steep+1% CaCO₃ | 6.05 | 711 |
| 3. 0.015% Corn Steep+1% CaCO₃ | 5.15 | 551 |
| 4. 0.5% Corn Steep | 6.6 | 772 |
| 5. 0.0005% 1-16-ax (a sample of RM 218 growth factor) | 4.8 | 414 |
| 6. 0.01% 1-16-ax (a sample of RM 218 growth factor) | 6.15 | 482 |

Thus, RM 218 factor stimulates the growth of the penicillium and the production of penicillin.

The RM 218 factor has been identified as a mixture of a nucleic acid and a sulfur-bearing amino acid, predominantly cytidene and cysteine; other nucleic acids include cytidilic acid and other sulfur-bearing amino acids include cystine and penicillamine.

I claim:

In the process of producing penicillin by fermentation, the step of adding a solid mixture of cytidene and cysteine to the media.

References Cited in the file of this patent

UNITED STATES PATENTS

| 2,320,479 | Sperti | June 1, 1943 |
| 2,448,790 | Foster et al. | Sept. 7, 1948 |
| 2,457,585 | McCormack | Dec. 28, 1948 |
| 2,476,107 | Moyer | July 12, 1949 |

OTHER REFERENCES

Foster: "Chemical Activities of Fungi," 1949, pages 232, 236, 241, 242, 246, 247, 248.

Karrer: Organic Chemistry, 4th English ed., 1950, pages 286–288, 830, 832.